US006314219B1

(12) United States Patent
Zhang et al.

(10) Patent No.: US 6,314,219 B1
(45) Date of Patent: Nov. 6, 2001

(54) FIBER MINI-BEND LIGHT GUIDE

(75) Inventors: Yi Zhang, Cupertino; Gary Ball, Los Gatos, both of CA (US)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/404,061

(22) Filed: Sep. 23, 1999

(51) Int. Cl.[7] .................................................. G02B 6/26
(52) U.S. Cl. ............................ 385/32; 385/96; 385/99; 385/80
(58) Field of Search ................................. 385/96, 97, 98, 385/99, 89, 80, 84, 32

(56) References Cited

U.S. PATENT DOCUMENTS

| | | | |
|---|---|---|---|
| 4,669,817 | * 6/1987 | Mori | 350/96.15 |
| 5,138,676 | 8/1992 | Stowe et al. | 385/32 |
| 5,233,677 | * 8/1993 | Winslow | 385/89 |
| 5,452,393 | 9/1995 | Stowe et al. | 385/123 |
| 5,495,541 | * 2/1996 | Murray et al. | 385/33 |

OTHER PUBLICATIONS

Frederick J Gillham et al, Miniature Fiber Optic Loop for Compact Optical Sensors, Nov. 1998, SPIE Conference on Fiber Optic and Laser Sensors and Applications, SPIE vol. 3541.

James E Hefferon, Calculating Bend and Twist Stress in Optical Fibers, 1986, Components for Fiber Optic Applications, SPIE vol. 722.

David W Stowe and Frederick J Gillham, Miniature Fiber Bends Offer Flexibility in Component and Circuit Design, Lightwave Special Reports (no date available).

David W Stowe, Frederick J Gillham, and Thomas R Ouellette, Compact Components Using Miniature–bend Technology, Jul. 1998, Fiberoptic News.

* cited by examiner

*Primary Examiner*—Georgia Epps
*Assistant Examiner*—Timothy Thompson
(74) *Attorney, Agent, or Firm*—Michael Pritzkau (57) ABSTRACT

A mini-bend optical arrangement and an associated method are described. This arrangement is designed to change the directional orientation of a light path using optical fiber. A first and a second fiber optic member define first and second light paths, respectively, which first and second members include a numerical aperture and which introduce substantial bend losses upon being bent at less than a predetermined bend radius. The first and second fiber optic members are arranged along the first and second paths preferably bent by less than the predetermined bend radius. A bent fiber optic member including a numerical aperture that is greater than the numerical aperture of the first and second fiber optic members interconnects the first and second fiber optic members so as to define a continuous light path including the first and second light paths with the bent member defining a curved path therebetween such that the bent fiber optic member has a bend radius which is less than the predetermined bend radius but which avoids introducing substantial bend losses. The mini-bend arrangement is useful in highly advantageous miniaturized device configurations. As a first example, a miniaturized add/drop module is introduced. As other examples, miniaturized tree couplers, EDFA modules and WDM modules are introduced.

20 Claims, 6 Drawing Sheets

FIBER MINI-BEND LIGHT GUIDE

BACKGROUND OF THE INVENTION

The present invention is related generally to the field of losses introduced in an optical light guide resulting from the need to abruptly change the directional orientation of the path of the optical light guide and, more particularly, to a highly advantageous miniature bend arrangement and associated method employing a particular configuration of fiber optic light guide members which avoids the introduction of significant bend losses.

Figure 1:
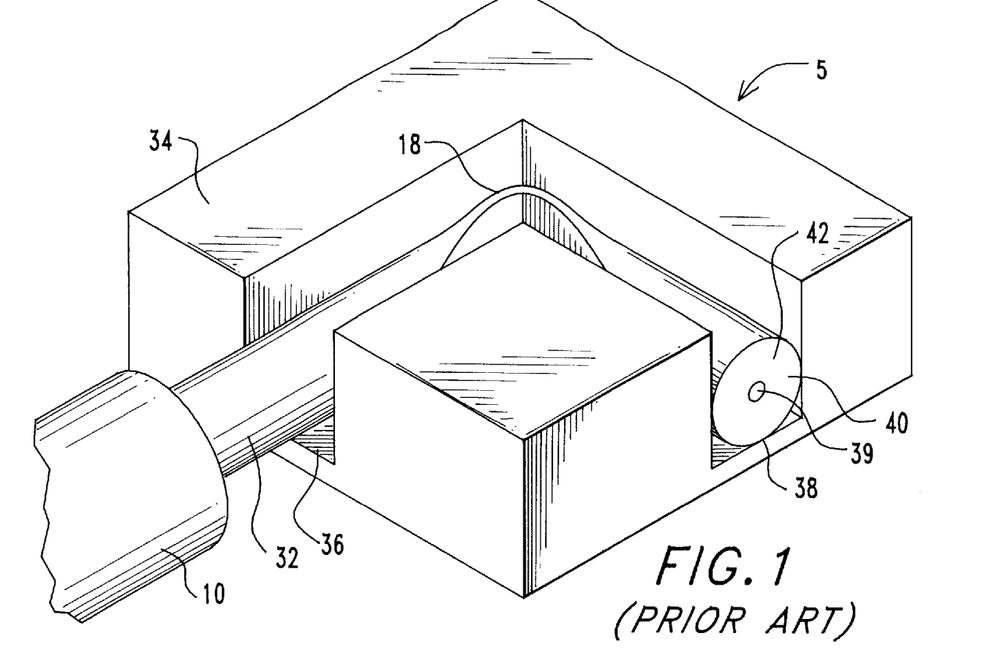
FIG. 1 is a diagrammatic perspective view which is representative of FIG. 6 from U.S. Pat. No. 5,138,676 illustrating a prior art structure configured for changing the directional orientation of a light path using an optical fiber configured with a reduced diameter section.

Attention is immediately directed to FIG. 1 which is a representation of FIG. 6 of U.S. Pat. No. 5,138,676 issued to Stowe et al and hereinafter referred to as the '676 patent. Optical fibers used, for example, in communications systems are known to produce losses with respect to light signals traveling on the fibers with the introduction of a sufficiently sharp bend. At the same time, it is often desirable to introduce such sharp bends for purposes such as, for instance, device miniaturization. In this regard, a typical optical fiber may be bent at a diameter of approximately 50 mm before introducing appreciable bend losses. One approach in attempting to resolve this problem is described in the '676 patent, as illustrated by FIG. 1. The latter shows a structure, generally indicated by the reference numeral 5, configured for introducing a sharp bend in a light path. Structure 5 includes a jacket 10 surrounding an optical fiber 32 which is, in turn, mounted in a right angle grooved supporting structure 34. The fiber enters the structure at reference number 36 and exits at 38 with its core 39 shown. Fiber 32 includes a reduced diameter section 18 which is bent at approximately a 90° angle. The diameter of the reduced diameter section is approximately 15 microns as compared to a normal diameter of approximately 125 microns. A polished end face 40 is included at one end which may be positioned adjacent to another device or fiber. A cladding 42 surrounds core 39 of the fiber. It is noted that a 180 degree bend using this reduced diameter section technique is disclosed in an article by David W. Stowe and Frederick J. Gillham entitled "Miniature Fiber Bends Offer Flexibility in Component and Circuit Design."

Having generally described structure 5 of FIG. 1, it should be appreciated that one underlying feature of the structure resides in substantially reducing the diameter of section 18 of fiber 32 in a way which removes the cladding. Initially, this fiber is surrounded by jacket 10 and is configured with cladding 42. To remove the cladding, the jacket is removed, as illustrated, and reduced diameter section 18 is produced, for example, in an etching process in combination with drawing. The cladding is removed at least to an extent that the interface between the reduced diameter section and the surrounding air is relied on to produce internal reflection of light traveling around the bend and through the reduced diameter section. Upon such removal of the cladding, the numerical aperture of the fiber itself in this region is submitted to be so low as to not serve as a useful light guide without further provisions. That is, the numerical aperture in the reduced diameter region is now determined based upon the difference between the index of refraction of the fiber as a whole and the index of refraction of the surrounding medium, in this instance, air. Typically, this numerical aperture is quite high, resulting in low bend losses for light traveling through reduced diameter section 18. While structure 5 generally serves its intended purpose, several disadvantages have been discovered, as will be described immediately hereinafter.

Still referring to FIG. 1, it is important to note that reduced diameter section 18 must be exposed to air (or some other suitable medium) along its entire length. Hence, the requirement for supporting structure 34. That is, reduced diameter section 18 must not contact anything but air to avoid adversely affecting the index of refraction produced through the cooperation of the air and the reduced diameter section. This requirement is submitted to be disadvantageous in and by itself. Moreover, the significance of achieving a sharp bend in the fiber is considered to be overshadowed by the disadvantageous requirement of supporting structure 34. The latter limits the usefulness of structure 5 particularly with regard to producing miniaturized devices, since such a housing must accompany the bent fiber. In future device generations this limitation is considered as being unacceptable. Moreover, it is submitted that structure 5 is complex and, as such, factory production environments are mandated using precision fixtures resulting in a relatively expensive final product.

The present invention provides a highly advantageous and heretofore unseen mini-bend arrangement and associated method which eliminates the foregoing disadvantages and which provides still further advantages.

SUMMARY OF THE INVENTION

As will be described in more detail hereinafter, there is disclosed herein a mini-bend optical arrangement and an associated method. This arrangement, like the prior art structure illustrated in FIG. 1, is designed to change the directional orientation of a light path. However, the arrangement of the present invention includes a first and a second fiber optic member defining first and second light paths, respectively, which first and second fiber optic members include a numerical aperture and which introduce substantial bend losses upon being bent at less than a predetermined bend radius. The first and second fiber optic members are arranged along the first and second paths preferably bent by less than the predetermined bend radius. A bent fiber optic member including a numerical aperture that is greater than the numerical aperture of the first and second fiber optic members interconnects the first and second fiber optic members so as to define a continuous light path including the first and second light paths with the bent fiber optic member defining a curved path therebetween such that the bent fiber optic member has a bend radius which is less than the predetermined bend radius but which avoids introducing substantial bend losses.

In one aspect of the invention, the mini-bend arrangement is useful in highly advantageous miniaturized device configurations. As a first example, a miniaturized add/drop module is described. Other examples include miniaturized tree couplers, EDFA modules and WDM modules.

BRIEF DESCRIPTION OF THE DRAWINGS

The present invention may be understood by reference to the following detailed description taken in conjunction with the drawings briefly described below.

DETAILED DESCRIPTION OF THE INVENTION

Figure 2:
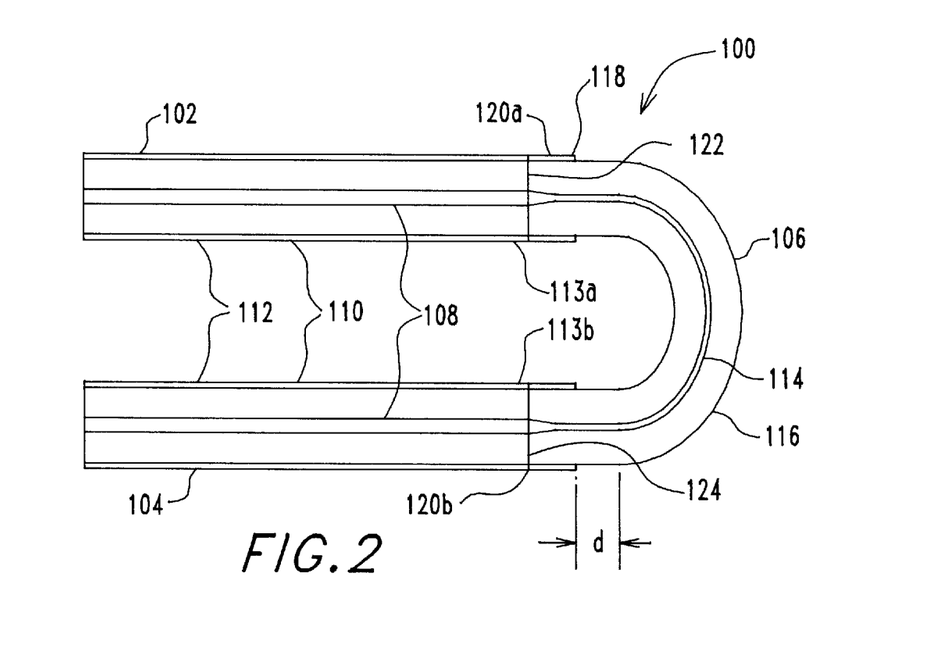
FIG. 2 is a cross-sectional view of a mini-bend optical fiber arrangement manufactured in accordance with the present invention shown here to illustrate details of its construction.

Having previously described FIG. 1, attention is immediately directed to FIG. 2 which illustrates a mini-bend fiber optic arrangement manufactured in accordance with the present invention and generally indicated by the reference numeral 100. It is noted that like reference numbers refer to like components wherever possible throughout the various figures. Arrangement 100 is shown in cross-section and includes first and second optical fibers 102 and 104, respectively, along with a high numerical aperture (NA) bent fiber 106. Fibers 102 and 104 are typically of the same type and include a core 108, a cladding 110 and a jacket 112. One end of fiber 102 is indicated by the reference number 113a and one end of fiber 104 is indicated by the reference number 113b. Bent fiber 106 likewise includes a core 114, a cladding 116 and a jacket 118 which is only partially present for reasons to be described at an appropriate point below. Opposing ends of the high NA fiber are indicated by the reference numbers 120a and 120b. End 113a of fiber 102 is spliced to end 120a of high NA fiber 106 at a splice 122 while end 113b of fiber 104 is spliced to opposing end 120b of high NA fiber 106 at a splice 124. It should be appreciated that the dimensions in FIG. 2 are not to scale for illustrative purposes. Further details with regard to this structure will be provided following an introduction to the fundamental concepts leading to the development of the invention.

In typical optical fibers such as fibers 102 and 104 in FIG. 2, the lower refractive index of the cladding relative to the core establishes modes that propagate with negligible loss down the fiber. In this structure, light can be conducted by total internal reflection attributable to the difference in index of refraction at the core and the cladding interface. In single mode fibers, the optical mechanism which allows a very significant reduction in bend radius relates to the change of waveguide structure. The loss in singlemode fiber configured with a bend can be calculated by the expression:

$$\alpha_c = A_c R^{-1/2} e^{-U/R} (dB), \quad (1)$$

where R is the bend radius of the fiber while $A_c$ and U are constant relative to cut-off wavelength and the difference of refraction index. $A_c$ and U can be approximately calculated, respectively as:

$$U \approx 0.705 \frac{(\Delta n)^{3/2}}{\lambda} \left[ 2.748 - 0.996 \left( \frac{\lambda}{\lambda_c} \right) \right]^3 (1/m), \quad (2)$$

$$A_c \approx 30 (\Delta n)^{1/4} \lambda^{-1/2} (\lambda_c/\lambda)^{3/2} (dB/m^{1/2}) \quad (3)$$

Therefore, the bend loss of singlemode fibers is strongly dependent upon the bend radii R, refraction index difference $\Delta n$ and ratio of operating wavelength $\lambda$ to cut-off wavelength $\lambda_c$.

From the foregoing expressions, the minimum critical bend radius of singlemode fiber with negligible light loss is given by:

$$R_c \approx 20 \frac{\lambda}{(\Delta n)^{3/2}} \left[ 2.748 - 0.996 \left( \frac{\lambda}{\lambda_c} \right) \right]^{-3}, \text{ and} \quad (4)$$

the numerical aperture is given by:

$$NA = (n_1^2 - n_2^2)^{1/2} \quad (5)$$

Because $\Delta n = n_1 - n_2$ is typically small, $n_1 \approx n_2$ and $$\Delta n \approx (NA)^2/(2n_1) \quad (6)$$

In an actual example using Corning SMF-28 fiber with NA=0.13, $n_1$=1.468, $\lambda_c$=1.2×10$^{-6}$ m and $\lambda$=1.55×10$^{-6}$ m, critical bend radius $R_c \approx$22.5 mm. However, if the NA of the fiber is larger, $\Delta n$ is larger and, hence, the critical bend radius is smaller. For commercial high NA fiber, NA=0.3~0.38 and $n_1$=1.468. Therefore, $R_c \approx$1.85~0.88 mm. It is important to note that this bend radius is only about one twelfth to one twenty-fifth of the corresponding SMF-28 fiber bend radius. Therefore, it is recognized herein that it is optically possible to bend high NA fiber at a small bend diameter (3 mm) without the introduction of significant bend loss.

At the same time, however, it should be appreciated that, when a fiber is bent into a small radius, the bend stress is given by:

$$S = Yd/[(D+d)(1-u)] \quad (7)$$

where S is the stress, Y is Young's modulus for fused silica, D is the bend diameter, d is the fiber diameter in the stressed region, and u is Posson's ratio. For a 3 mm diameter bend, D=3 mm, d=0.125 mm, Y/(1−u)≈12750 kpsi. Thus, the associated bend stress is approximately 510 kpsi. Such a high NA fiber is typically capable of accommodating stress on the order of approximately 100 to 150 kpsi. Thus, a level of stress around 510 kpsi is likely to result in fiber breakage. However, the present invention further recognizes that the stress in the bend region of the high NA fiber may be relieved thermally in the instance where the bend diameter is small enough to induce stress sufficient to cause fiber breakage. In that instance, the fiber in the bend region is thermally annealed in a way which "reforms" the fiber into the desired bent shape to remove the bend stress. While thermal annealing has been used in the prior art, Applicants are unaware of its use with a high NA fiber for the purpose of producing an abrupt bend therein. Through the application of this procedure, the reliability of the mini-bend fiber arrangement of the present invention is intrinsically very high and comparable to the excellent reliability achieved with normal fibers. It should be appreciated that stress relief is not required in the case where the bend diameter is not small enough to induce such stress at a level that will cause fiber breakage. For example, a high NA fiber having a bend diameter in the range from 15 mm up to 50 mm will not require stress relief.

With reference again to FIG. 2, it should be appreciated that high NA fiber 106 typically includes a smaller mode field diameter than first and second fibers 102 and 104. For example, if the aforementioned SMF-28 single mode fiber is used for fibers 102 and 104, spliced to each end of high NA fiber 106, a splice mismatch is presented. That is, the refractive index profile of high NA fiber is recognized to be incompatible with that of standard fiber. The splicing loss by mode field diameter (MFD) and numerical aperture NA mismatch can be calculated as follows:

$$E.L.(dB) = 10 \log\left|\frac{NA_1}{NA_2}\right|(dB) \quad (8)$$

representing the loss due to NA mismatch, where $NA_1$ is the numerical aperture of high NA fiber 106 and $NA_2$ is the numerical aperture of fibers 102 and 104. The MFD loss is represented by:

$$E.L.(dB) = 20 \log\left(\frac{1+(W_1/W_2)^2}{2(W_1/W_2)}\right)(dB) \quad (9)$$

where $NA_1$ and $W_1$ are the numerical aperture and mode field diameter of fiber 102 and $NA_2$ and $W_2$ are the numerical aperture and mode field diameter of fiber 104, respectively. With no attempt to match the high NA fiber to fibers 102 and 104, the resulting mismatch losses are approximately 0.5 dB for each of splices 122 and 124. Accordingly, a suitable technique such as, for example, a thermally expanded core (TEC) fiber process or other fusion based technique may be used to reduce the splicing losses. In the TEC process (not shown), the MFD of a fiber is enlarged by diffusing germanium dopant typically present in the core of the fiber into the cladding. This can be observed (irrespective of the specific technique employed) as the expanded diameter core of fiber 106 adjacent splices 122 and 124. Thus, the difference of refractive index Δn between the core and the cladding of the fiber is reduced with diffusion (i.e., heating) time. Through the diffusion of the fiber doping material, the product of effective core diameter a and index difference Δn is kept constant, so that:

$$a \cdot \Delta n = K, \quad (10)$$

or $$a = K/\Delta n \quad (11)$$

where K is the constant. Because the refractive index difference, Δn, is made smaller, the core diameter is made larger and also the mode field diameter (MFD) is correspondingly greater. Considering NA, which can be expressed as:

$$NA = n_1 \cdot \sqrt{2 \cdot \Delta n} \quad (12)$$

Again, because the refractive index difference, Δn, is made smaller, the NA is correspondingly smaller. In view of these expressions, high NA fiber 106 may be very closely matched to standard low loss telecommunications fibers (NA=0.13) such as fibers 102 and 104. Losses may reduced to less than 0.05 dB for the overall mini-bend arrangement having a bend diameter of 3 mm.

Figure 3:
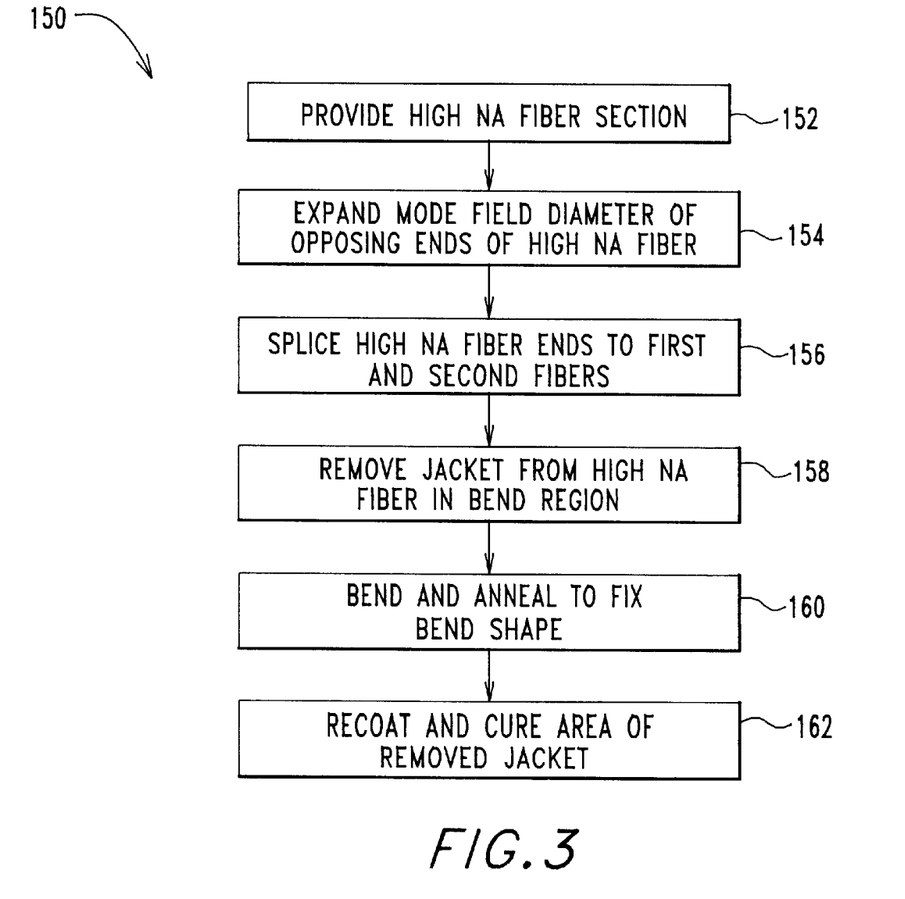
FIG. 3 is a flow diagram illustrating one method, in accordance with the present invention, for producing the fiber mini-bend arrangement shown in FIG. 2.

Turning now to FIG. 3 in conjunction with FIG. 2, one method of producing the fiber mini-bend arrangement of the present invention is generally indicated by the reference numeral 150. Method 150 begins with step 152 in which a section of high NA fiber is provided. Fibers that are suited to this purpose include any fiber having an NA greater than 0.16. One particularly suitable fiber is a high NA fiber with an NA of 0.3. In step 154, the mode field diameter of opposing ends 120a and 120b of the high NA fiber are expanded (not shown) using, for example, the aforementioned thermally expanded core fiber process to match the mode field diameter of fibers 102 and 104 which are, in this instance, selected as SMF-28 fiber. Step 156 then follows in which the high NA fiber ends are spliced to ends 113a and 113b of fibers 102 and 104 to form splices 122 and 124, respectively. This splicing may be performed, for example, using a fusion splicer. The splicing excess loss should be less than a total of 0.05 dB for the combination of both splices.

Still describing method 150, in step 158, jacket 118 of the high NA fiber is stripped in the bend region and up to a distance of approximately 20 mm from the bend region indicated by the dimension d in FIG. 2. In step 160, the bend region of the high NA fiber is bent and then annealed to fix its shape. Annealing may be performed, for example, under a 1100–1400° C. flame for approximately one second. It is noted that, so long as the bend diameter is equal to or greater than the minimum value taught herein (in this instance, 3 mm for the selected high NA fiber), there is no significant light loss during subsequent operation, irrespective of the bend shape. That is, complex two or three dimensional planer bend shapes are contemplated so long as bend diameter is not less than the minimum value specified herein. Step 162 is next performed in which the unjacketed portion of high NA fiber 106 is recoated using a suitable material such as, for example, acrylic resin. The latter is cured using UV light exposure. It is noted that the recoating has not been shown for illustrative purposes. In this regard it is to be understood that the recoating step is not necessarily a requirement. That is, the function of recoating does not serve in any way to enhance light guiding characteristics but only serves as a measure to physically protect and further strengthen the high NA fiber.

Optical performance of the mini-bend configuration of the present invention has been tested with the following results:

Insertion loss: 0.1 dB (Max.) 0.05 dB (Typical)

Polarization dependent loss: ≦0.01 dB

Backreflection: ≦−70 dB

Operating wavelength: 1260–1650 nm

Operating temperature: −40° C.~85° C.

Thermal stability: 0.0001 dB/° C.

Insertion loss ripple: ≦0.03 dB

Insertion loss change by recoating: ≦0.01 dB

Bend diameter: ≧3 mm

Environmental Performance

Damp heat test: 85% RH, 85° C. for 1000 hours

Dry heat test: 85° C. for 1000 hours

Impact test: 1.8 meter, 24 drops

Insertion loss change after damp heat test: ≦0.03 dB

Insertion loss change after dry heat test: ≦0.03 dB

Insertion loss change after impact test: ≦0.01 dB

Figure 4:
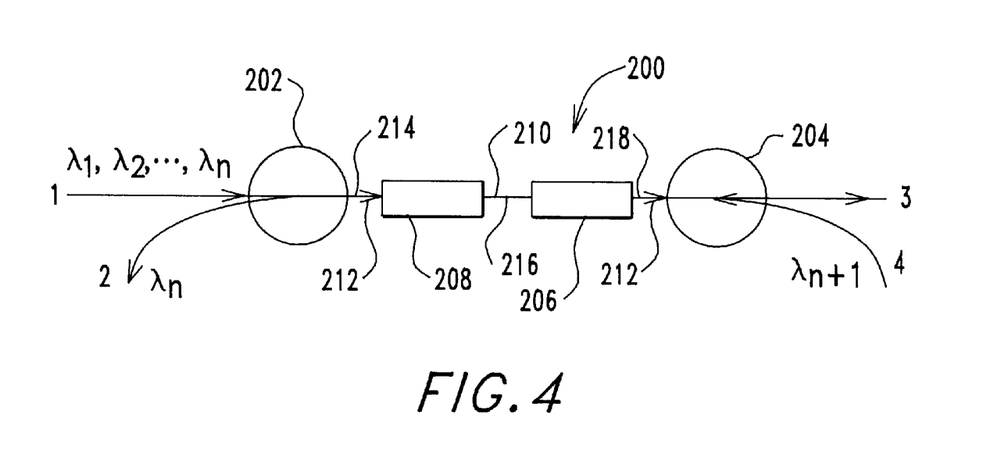
FIG. 4 is a block diagram illustrating an add/drop module which advantageously utilizes a plurality of the fiber mini-bends of the present invention.
Figure 5:
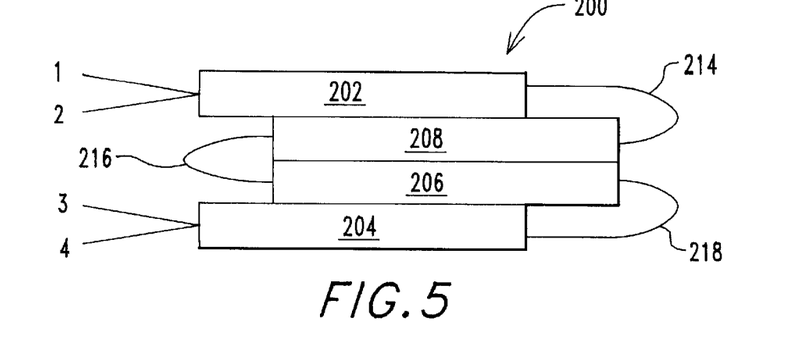
FIG. 5 is a diagrammatic illustration, in elevation, of one physical implementation of the add/drop module of FIG. 4.

Referring now to FIGS. 4 and 5, the mini-bend arrangement of the present invention is highly suited for use in a number of devices which may dramatically reduce the overall size outlines of these device packages. For example, FIG. 4 illustrates, in block diagram form, an add/drop module generally indicated by the reference number 200. Module 200 includes first and second circulators 202 and 204, respectively, along with first and second fiber gratings 206 and 208. These components are arranged to form a device body. First circulator 202 includes an input port 1 and a drop port 2 while second circulator 204 includes an output port 3 and an add port 4. The primary light path is indicated by reference number 210 with arrowheads 212 indicative of the forward direction. FIG. 5 diagrammatically illustrates a miniaturized physical implementation of the module including first, second and third fiber mini-bends 214, 216 and 218, respectively, manufactured in accordance with the present invention. Mini-bend 214 connects the primary path end of first circulator 202 with one end of second fiber grating 208, mini-bend 216 connects the opposing end of second fiber grating 208 with one end of first fiber grating 206 and mini-bend 218 connects the opposing end of first fiber grating 206 with the primary path end of second circulator 204. In each instance, the diameter of the fiber mini-bend is not less than 3 mm. Connection of the mini-bends to the components of the device body may be made, for example, by appropriate splicing.

Figure 6:
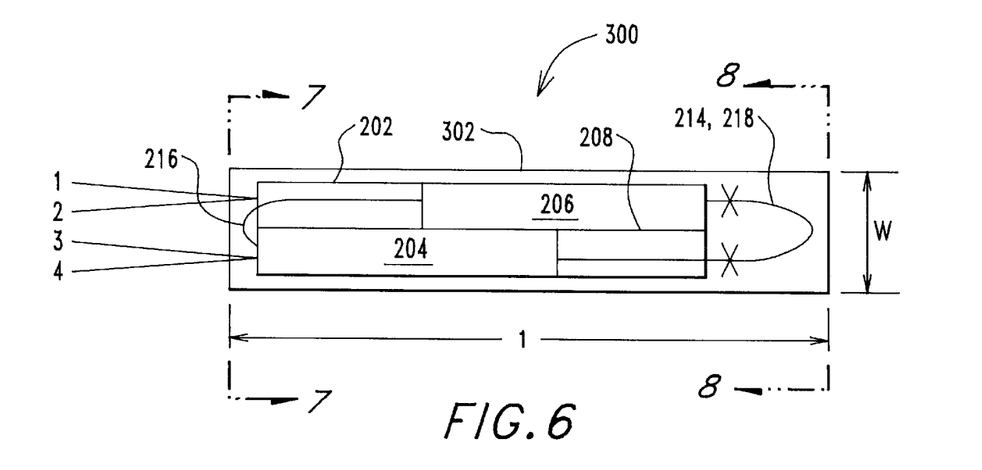
FIG. 6 is a diagrammatic illustration, in elevation, of another physical implementation of the module of FIG. 4 shown here to emphasis a highly compact construction of the module.

Referring to FIG. 6, a physical implementation of an add/drop module, generally indicated by the reference number 300 and based on module 200, is illustrated. Module 300 is thought to be highly miniaturized as a result of the use of the mini-bend of the present invention in conjunction with the arrangement of the various functional components already described. The overall module is encapsulated using a suitable encapsulant 302 which is illustrated as being transparent for illustrative purposes. Again, it is noted that encapsulant 302 has no effect on the light conductive capacity of mini-bends 214, 216 and 218. However, the encapsulant is useful with regard to providing physical support and protection to the mini-bends. It should be noted that circulator 202 is partially out of view by virtue of being directly behind fiber grating 206 while fiber grating 208 is partially out of view by virtue of being directly behind circulator 204.

Figure 7:
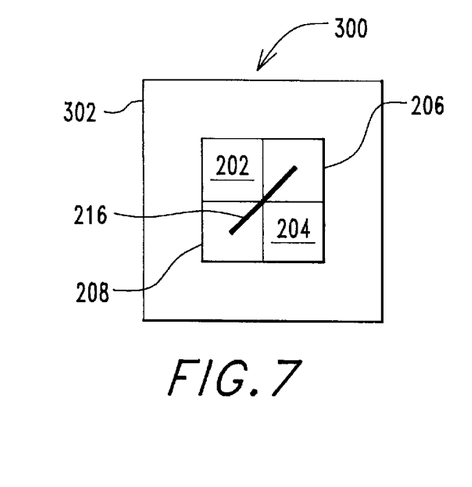
FIG. 7 is a diagrammatic illustration, in elevation, of one end of the module of FIG. 6, showing the arrangement of one fiber mini-bend on that end in accordance with the present invention.
Figure 8:
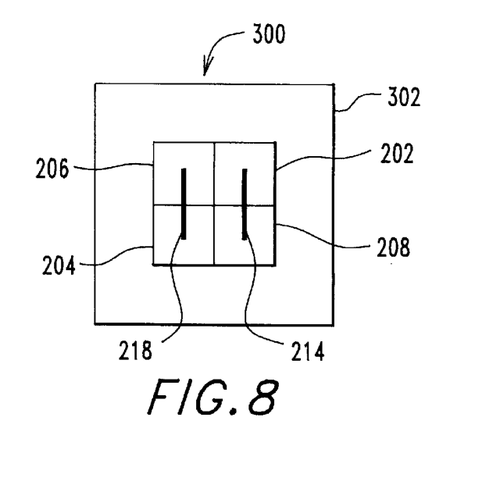
FIG. 8 is a diagrammatic illustration, in elevation, of the other end of the module of FIG. 6, showing the arrangement of two fiber mini-bends on that end in accordance with the present invention.

Turning to FIGS. 7 and 8 in conjunction with FIG. 6, the compact positioning of the various components which make up module 300 will now be described. Circulators 202 and 204 are arranged diagonally opposing one another in a rectangular pattern, as seen in the cross-sectional end views of FIGS. 7 and 8, along with fiber gratings 206 and 208, also diagonally opposing one another. The circulator ports have not been illustrated for purposes of clarity. The fiber gratings are laterally offset with respect to the circulators, as can be seen in FIG. 6. Mini-bend 216 runs on a diagonal (FIG. 7) to interconnect fiber gratings 206 and 208. It can be seen in FIG. 8 that mini-bend 214 runs vertically to connect circulator 202 with fiber grating 208 and mini-bend 218 runs vertically to connect circulator 204 with fiber grating 208. It is submitted that this arrangement is highly advantageous with respect to overall compactness. The length, l, and width, w, may be on the order of approximately 120 mm by 14 mm with a depth of approximately 14 mm for standard size circulators and fiber gratings. In comparison, a prior art module (not shown) configured with standard fiber bent at a 50 mm diameter includes dimensions of approximately 120 mm by 80 mm by 15 mm. Thus, the add/drop circulator of the present invention is approximately ⅙ the size of such a prior art configuration.

Figure 9:
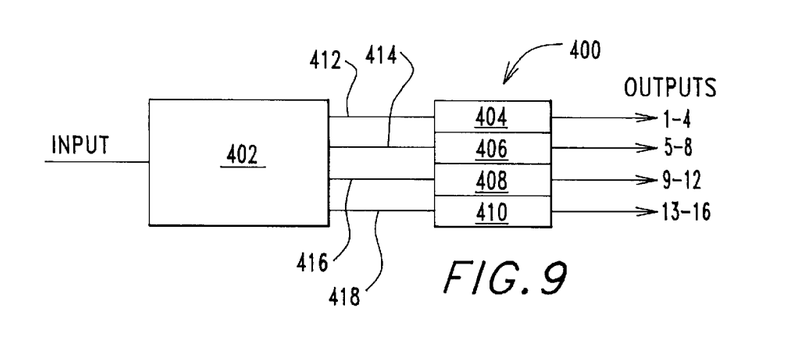
FIG. 9 is a block diagram illustrating a tree coupler module which advantageously utilizes a plurality of the fiber mini-bends of the present invention.

Attention is now directed to FIG. 9 which illustrates, in block diagram form, an optical coupler module, generally indicated by the reference number 400, that advantageously utilizes the fiber mini-bend of the present invention. Coupler 400 is a one by sixteen (1×16) coupler that is made up of five one by four (1×4) optical couplers indicated by the reference numbers 402, 404, 406, 408 and 410. Outputs 1–4 are provided by coupler 404, outputs 5–8 are provided by coupler 406, outputs 9–12 are provided by coupler 408 and outputs 13–16 are provided by coupler 410. Coupler 402 receives one input from which it provides four outputs on lines indicated by the reference numbers 412, 414, 416 and 418, respectively, extending to each of couplers 404, 406, 408 and 410. As will be seen, lines 412, 414, 416 and 418 advantageously comprise fiber mini-bend manufactured in accordance with the present invention.

Figure 10:
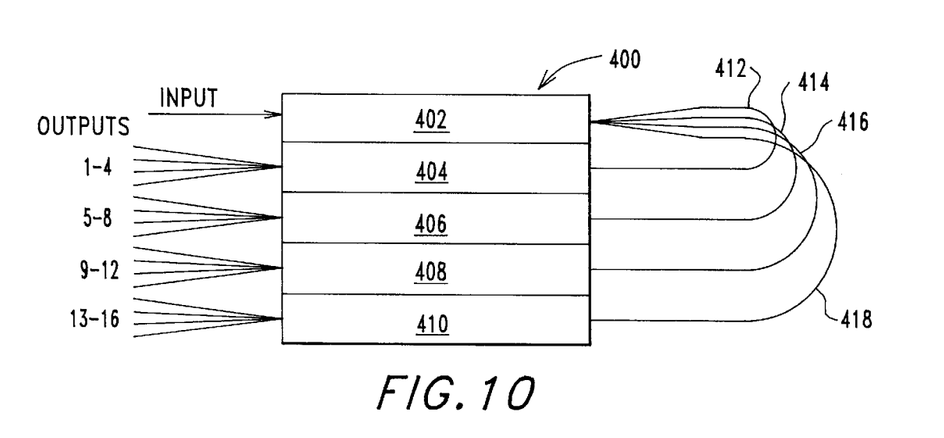
FIG. 10 is a diagrammatic illustration, in elevation, of one physical implementation of the tree coupler module of FIG. 9.

Referring now to FIG. 10 in conjunction with FIG. 9, the physical structure of 1×16 coupler module 400 will be described. FIG. 10 diagrammatically illustrates one miniaturized physical implementation of the module including the outputs from the various 1×4 couplers, as described above. Additionally, fiber mini-bends 412, 414, 416 and 418 are illustrated. Mini-bend 412 runs from a first output of coupler 402 to the input of coupler 404, mini-bend 414 runs from a second output of coupler 402 to the input of coupler 406, mini-bend 416 runs from a third output of coupler 402 to the input of coupler 408 and mini-bend 418 runs from a fourth output of coupler 402 to the input of coupler 410. It should be mentioned that the mini-bends have not been illustrated accurately with regard to diameter in this diagrammatic figure.

Figure 11:
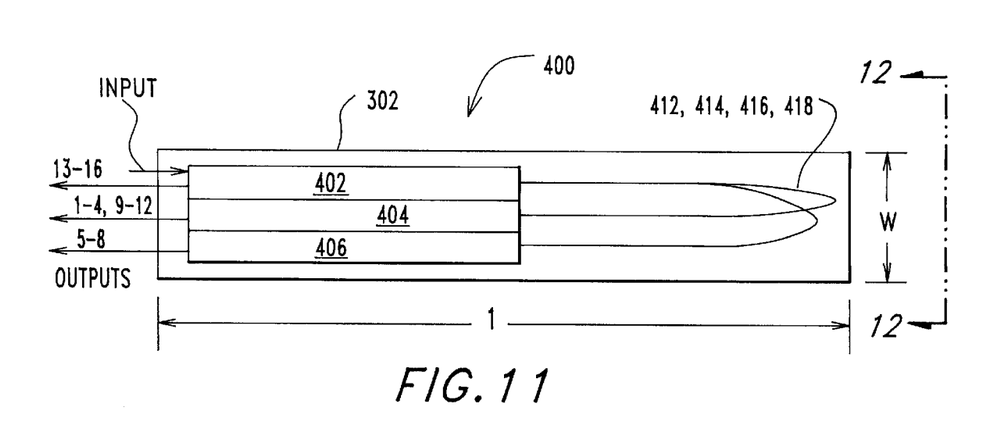
FIG. 11 is a more detailed diagrammatic illustration, in plan view, of another physical implementation of the module of FIG. 9 shown here to emphasis a highly compact construction of the module.
Figure 12:
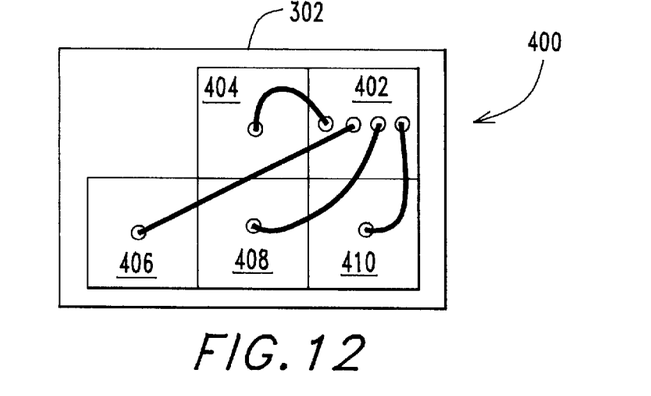
FIG. 12 is a diagrammatic illustration, in elevation, of one end of the module of FIG. 11, showing the arrangement of four fiber mini-bends on that end in accordance with the present invention.

Referring to FIGS. 10–12, one possible physical implementation of 1×16 coupler module 400 will be described. In FIGS. 11 and 12, the five 1×4 couplers which make up coupler module 400 are shown in a stacked configuration. FIG. 11 is a plan view showing couplers 402 and 404 which make up an upper layer of the stacked configuration and also showing coupler 406 in a lower layer of the stacked configuration. FIG. 12 is an end view shown here to illustrate both the upper and lower layers of the stacked configuration of an overall device body. Couplers 408 and 410 reside in the lower layer (FIG. 12) and, hence, are not visible in FIG. 11 since coupler 408 is directly beneath coupler 404 while coupler 410 is directly beneath coupler 402. It should be appreciated a package cross-section (not shown) other than rectangular cross-section shown may be used for the 1×4 optical couplers. For example, a circular package cross-section may just as readily be used. In the instance of the use of circular cross-section couplers, the upper layer couplers may be stacked in the spaces defined between the couplers of the lower layer thereby creating a very compact stacking arrangement. It should also be appreciated that mini-bends 412, 414, 416 and 418 may be connected to the output end of coupler 402 in any suitable configuration including the linear arrangement shown in FIG. 12. As one alternative (not shown), a rectangular connection arrangement could be used. The mini-bends may be connected with the 1×4 optical couplers, for example, by suitable splicing. Once again, encapsulant 302 affords support and physical protection for the mini-bends. The miniaturized 1×16 coupler module represents only one example of a coupler module advantageously using the fiber mini-bend of the present invention. It is considered that one having ordinary skill in the art may produce a great variety of other coupler modules in view of this overall disclosure. For example, a 1×8 module can be produced using 1×2 and two 1×4 couplers.

With regard to the physical size of module 400, the module may readily be produced using the fiber mini-bend of the present invention having dimensions of approximately a length, 1, of 120 mm, width, w, of 11 mm and a depth (not shown) of 9 mm for a 1×16 coupler module using standard size 1×4 coupler components. A 1×8 coupler module may include dimensions of approximately 110 mm by 11 mm by 6 mm using standard size coupler components. In either instance, the fiber mini-bends include a bend diameter of no less than 3 mm. It is thought that coupler module 400 may be produced having a size of less that one-tenth that of comparable prior art modules using conventional bent fibers.

Figure 13:
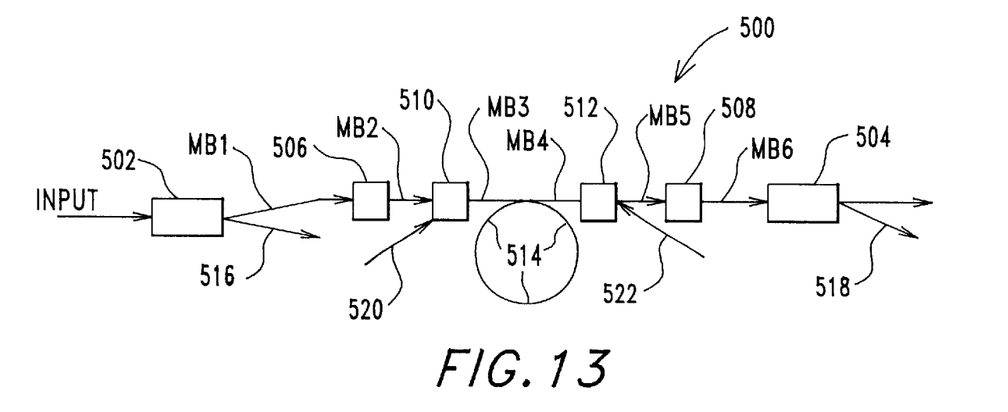
FIG. 13 is a block diagram illustrating an EDFA module which advantageously utilizes a plurality of the fiber mini-bends of the present invention.

FIG. 13 illustrates, in block diagram form, an Erbium Doped Fiber Amplifier (EDFA) module, generally indicated by the reference number 500, that advantageously utilizes the mini-bend fiber of the present invention. EDFA module 500 defines a device body that includes input and output tap couplers 502 and 504, respectively. An input isolator 506 and an output isolator 508 are provided along with first and second WDM modules 510 and 512 between which an erbium doped fiber 514 is positioned. First and second photodetector outputs 516 and 518 are provided as well as first and second pump inputs 520 and 522. Because the subject of interest here resides in miniaturization, details regarding the operation of EDFA module 500 will not be provided since these details are known in the art. Moreover, the structure of FIG. 13 will be familiar to one of ordinary skill in the art, aside from the use of the fiber mini-bend of the present invention which provides for significant miniaturization capability.

Figure 14:
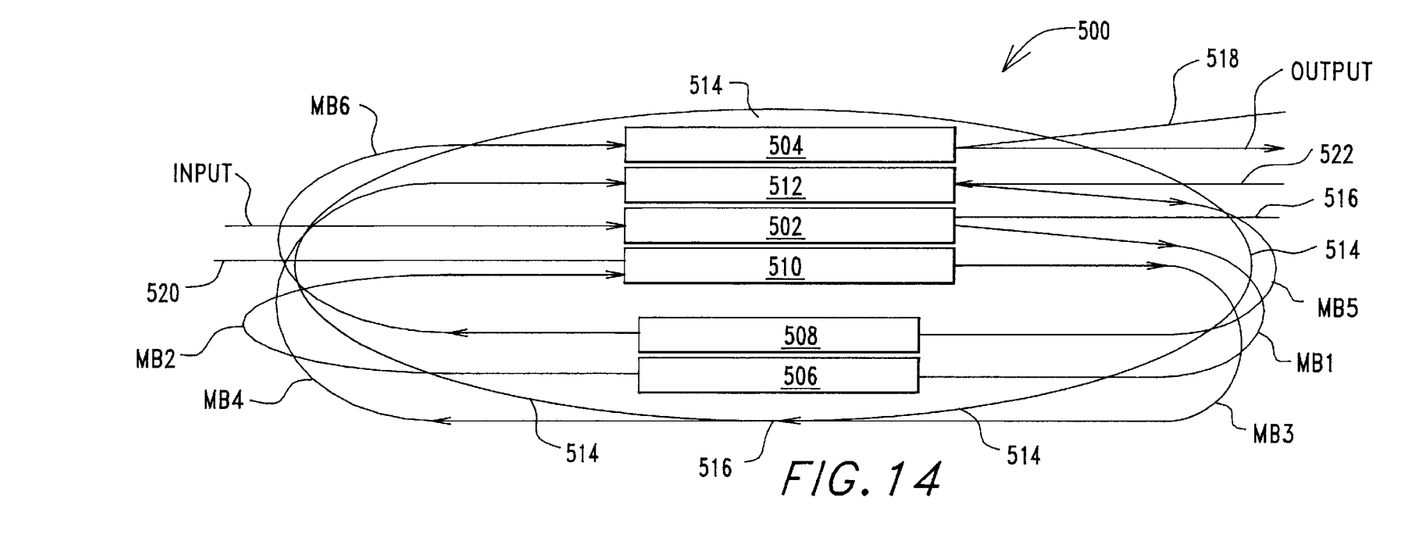
FIG. 14 is a diagrammatic illustration, in plan view, of the EDFA module of FIG. 13 showing its highly advantageous use of six fiber mini-bends.

Turning to FIG. 14 in conjunction with FIG. 13, one miniaturized implementation of EDFA module 500 will be described through the use of diagrammatic FIG. 14. Encapsulant has not been shown for purposes of clarity. In this implementation, six fiber mini-bends indicated as MB1–6 are used to interconnect the various components. It is noted that the mini-bends appear as straight lines in FIG. 13 for purposes of clarity in illustrating the primary signal path. Specifically, MB1 connects input tap coupler 502 with input isolator 506, MB2 connects input isolator 506 with first WDM module 510, MB3 connects the first WDM module with one end of erbium doped fiber 514, MB4 connects the other end of erbium doped fiber 514 with second WDM 512, MB5 connects second WDM 512 with output isolator 508 and MB6 connects output isolator 508 with output tap coupler 504. It should be noted that erbium doped fiber 514 is looped about the periphery of the overall device body in a way which does not violate its minimum bend diameter which may be on the order of approximately 35 mm. The ends of the loop (not shown) are at a point 516 at which MB3, MB4 and the loop itself appear to intersect in the view of FIG. 14. Mini-bends MB3 and MB4 may be spliced to the ends of the erbium doped fiber, for example, using a suitable fusion technique. Of course, mini-bends MB1–6 are configured so as not to violate their minimum diameter, as calculated previously to be 3 mm. Accordingly, a package having dimensions of approximately 140 mm by 35 mm by 10 mm may be produced using the fiber mini-bends of the present invention. This is thought to be approximately only 40% of the size of prior art modules.

Figure 15:
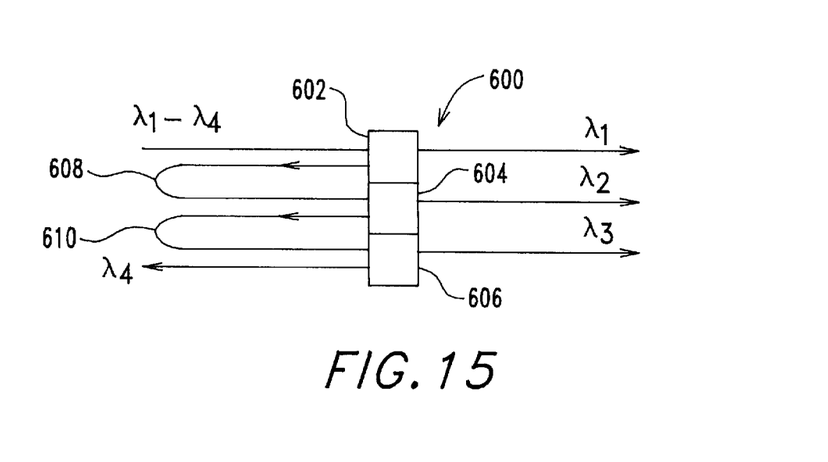
FIG. 15 is a block diagram illustrating a WDM module which advantageously utilizes a plurality of the fiber mini-bends of the present invention.

FIG. 15 illustrates, in block diagram form, a DWDM module, generally indicated by the reference number 600, that advantageously utilizes the mini-bend fiber of the present invention. DWDM module 600 includes three thin film WDM filters 602, 604 and 606. This type of filter is known in the art to permit only one wavelength of a plurality of wavelengths to pass therethrough. Filters 602, 604 and 606 are tuned to wavelengths $\lambda_1$, $\lambda_2$ and $\lambda_3$, respectively. These wavelengths, along with $\lambda_4$, are shown being injected at the input of module 600. Accordingly, $\lambda_1$ passes through filter 60, $\lambda_2$ passes through filter 604 and $\lambda_3$ passes through filter 606 leaving $\lambda_4$ at an output of filter 606.

Figure 16:
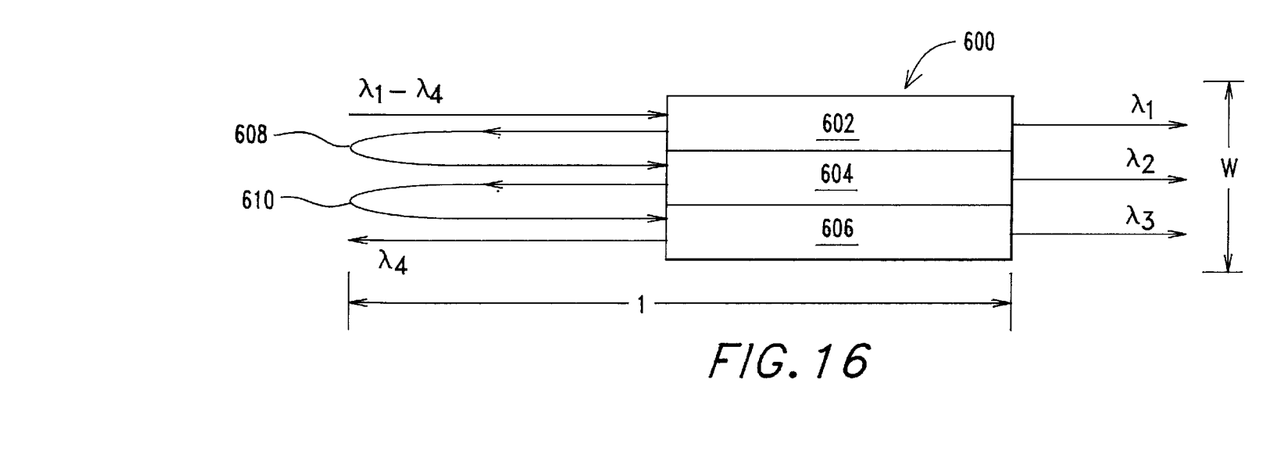
FIG. 16 is a diagrammatic illustration, in plan view, of the WDM module of FIG. 16 showing its highly advantageous use of two fiber mini-bends.

Referring to FIG. 16 in conjunction with FIG. 15, module 600 is illustrated using a "linear" miniaturized arrangement of filters 602, 604 and 606. In this regard, it should be appreciated that other, even more compact arrangements are possible, for example, in the stacked manner illustrated by FIG. 11. Details of the operation of the module will not be given beyond those already provided for purposes of brevity since one of ordinary skill in the art will recognize the functional concept embodied by the overall structure of module 600. However, module 600 includes first and second fiber mini-bends 608 and 610 in accordance with the present invention. Mini-bend 610 routes the output of filter 602 to the input of filter 604 while mini-bend 610 routes the output of filter 604 to the input of filter 606. Thus, module 600 is advantageously miniaturized through the use of the fiber mini-bend of the present invention. For the depicted four wavelength embodiment, module 600 may include dimensions of approximately a length, 1, of 100 mm, width, w, of 20 mm and a depth (not shown) of 8 mm. For an eight wavelength embodiment (not shown) the dimensions are approximately 100×25×14 mm. It is submitted that through the use of the fiber mini-bend of the present invention, the four wavelength module is approximately ⅛ the size of a conventional four wavelength module and the eight wavelength module is approximately ⅛ the size of a conventional eight wavelength module.

In view of the foregoing device configurations, it should be appreciated that use of the present invention is equally applicable to the task of miniaturizing virtually any device required abrupt changes in the directional orientation of a light path. The mini-bend arrangement is highly advantageous in eliminating the need for a housing dedicated to protecting the bend arrangement itself and in permitting contact with the bent fiber region, for example, by another component or by an overall device housing. In fact, jacket like coatings may readily be applied to the bent fiber region where the factory jacket was initially removed. Unlike the prior art described above, any bend diameter from 3 mm up to 50 mm is considered to be suitable in the mini-bend arrangement.

It is contemplated that the present invention will help to meet the ever-increasing demand for higher levels of integration in smaller fiber optical equipment and components. Moreover, it is considered that the trend of miniaturization of components and modules is accelerating with Dense Wavelength Division Multiplexing (DWDM) technology. Using this invention, it is possible to form small, low loss environmentally stable bends using commercially available optical fiber. A bend diameter of approximately 3 mm with 180° of bend is obtained with insertion loss less than 0.05 dB and with insubstantial risk of fiber breakage. The invention produces fundamental, but heretofore unavailable advantages using standard fiber and a versatile method. Moreover, the mini-bend arrangement has been proven in standard test environments. It is submitted that the present invention offers unprecedented flexibility in the management of fiber circuitry and miniaturization of fiber optical components and modules. The method is low-cost, repeatable, flexible and suitable for both mass production and for use in the field. Accordingly, a wide variety of fundamentally new components are contemplated including, but not limited to those described herein.

Since the mini-bend arrangement and associated method disclosed herein may be provided in a variety of different configurations and the method may be practiced in a variety of different ways, it should be understood that the present invention may be embodied in many other specific ways without departing from the spirit or scope of the invention. Therefore, the present examples and methods are to be considered as illustrative and not restrictive, and the invention is not to be limited to the details given herein, but may be modified within the scope of the appended claims.

What is claimed is:

1. In a fiber optic arrangement having first and second fiber optic members defining first and second light paths, respectively, which first and second members include a numerical aperture and which introduce substantial bend losses upon being bent at less than a predetermined bend radius, said first and second fiber optic members being arranged along said first and second light paths preferably bent by less than the predetermined bend radius, the improvement comprising:

a bent fiber optic member including a numerical aperture that is greater than the numerical aperture of the first and second fiber optic members and which interconnects said first and second fiber optic members so as to define a continuous light path including the first and second light paths with the bent fiber optic member defining a curved path therebetween, said bent fiber optic member having a bend radius which is less than said predetermined bend radius but which avoids introducing substantial bend losses and said first and second fiber optic members include a larger mode field diameter than the bent fiber optic member and wherein the bent fiber optic member includes first and second ends forming an interconnection with the first and second fiber optic members, respectively, and the first and second ends of the bent fiber optic member are treated in a predetermined way to match the mode field diameter of the bent fiber optic member to the mode field diameter of the first and second fiber optic members.

2. The improvement according to claim 1 wherein the numerical aperture of the bent fiber optic member is at least 0.16.

3. The improvement according to claim 1 wherein the minimum bend diameter of the bent fiber optic member is approximately 3 millimeters.

4. The improvement according to claim 1 wherein the bent fiber optic member is formed using a high NA single mode fiber.

5. The improvement according to claim 1 wherein said bent fiber optic member is thermally annealed to relieve bending stress.

6. The improvement according to claim 1 wherein the bent fiber optic member is originally provided with a factory jacket and wherein the factory jacket is removed in the region of said curved path.

7. The improvement according to claim 6 wherein the region of the removed factory jacket is recoated with a suitable material.

8. The improvement according to claim 7 wherein the said suitable material is acrylic resin.

9. The improvement according to claim 1 wherein the losses produced by introducing the bent fiber optic member are less than approximately 0.05 dB.

10. A light guide arrangement comprising:

a) a first and a second fiber optic member having first and second mode field diameters, and defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius; and b) a bent fiber optic member having a mode field diameter that is smaller than the mode field diameters of the first and second fiber optic members and including a numerical aperture that is greater than the numerical aperture of the first and second fiber optic members and wherein the bent fiber optic member includes first and second ends forming interconnections with the first and second fiber optic members, respectively, and the first and second ends of the bent fiber optic member are treated in a predetermined way to match the mode field diameter of the bent fiber optic member to the first and second mode field diameters of the first and second fiber optic members, and wherein the bent fiber optic member interconnects said first and second fiber optic members so as to define a continuous light path including the first and second light paths with the bent member defining a curved path therebetween, said bent fiber optic member having a bend radius which is less than said predetermined bend radius but which avoids introducing substantial bend losses.

11. The arrangement according to claim 10 wherein the numerical aperture of the bent fiber optic member is at least 0.16.

12. The arrangement according to claim 10 wherein the minimum bend diameter of the bent fiber optic member is approximately 3 mm.

13. The arrangement according to claim 10 wherein the bent fiber optic member is formed using a high NA single mode fiber.

14. The arrangement according to claim 10 wherein the losses produced by introducing the light guide arrangement in the continuous light path are less than approximately 0.05 dB.

15. An add/drop module comprising:

an add/drop device body; and a first and a second fiber optic member defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius and wherein the first and second fiber optic members define opposing ends of the light guide arrangement which are connected with said add/drop device body; and a bent fiber optic member including a numerical aperture that is greater than the numerical aperture of the first and second fiber optic members and which interconnects said first and second fiber optic members so as to define a continuous light path including the first and second light paths with the bent member defining a curved path therebetween, said bent fiber optic member having a bend radius which is less than said predetermined bend radius but which avoids introducing substantial bend losses.

16. A tree coupler comprising:

a coupler body; and a first and a second fiber optic member defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius and wherein the first and second fiber optic members define opposing ends of the light guide arrangement which are connected with said coupler body; and a bent fiber optic member including a numerical aperture that is greater than the numerical aperture of the first and second fiber optic members and which interconnects said first and second fiber optic members so as to define a continuous light path including the first and second light paths with the bent member defining a curved path therebetween, said bent fiber optic member having a bend radius which is less than said predetermined bend radius but which avoids introducing substantial bend losses.

17. An EDFA module comprising:

a device body; and a first and a second fiber optic member defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius and wherein the first and second fiber optic members define opposing ends of the light guide arrangement which are connected with said device body; and a bent fiber optic member including a numerical aperture that is greater than the numerical aperture of the first and second fiber optic members and which interconnects said first and second fiber optic members so as to define a continuous light path including the first and second light paths with the bent member defining a curved path therebetween, said bent fiber optic member having a bend radius which is less than said predetermined bend radius but which avoids introducing substantial bend losses.

18. A WDM module comprising:

a device body configured for wavelength filtering; and a first and a second fiber optic member defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius and wherein the first and second fiber optic members define opposing ends of the light guide arrangement which are connected with said device body; and a bent fiber optic member including a numerical aperture that is greater than the numerical aperture of the first and second fiber optic members and which interconnects said first and second fiber optic members so as to define a continuous light path including the first and second light paths with the bent member defining a curved path therebetween, said bent fiber optic member having a bend radius which is less than said predetermined bend radius but which avoids introducing substantial bend losses.

19. In a fiber optic arrangement having first and second fiber optic members including first and second mode field diameters and defining first and second light paths, respectively, which first and second members include a numerical aperture and which introduce substantial bend losses upon being bent at less than a predetermined bend radius, said first and second fiber optic members being arranged along said first and second paths preferably bent by less than the predetermined bend radius, the improvement comprising the steps of:

bending a fiber optic member, having bent fiber first and second ends, and including a mode field diameter that is smaller than the first and second mode field diameters of the first and second fiber optic members and a numerical aperture that is greater than the numerical aperture of the first and second fiber optic members using a bend having a bend radius which is less than said predetermined bend radius but which avoids introducing substantial bend losses, and treating the bent fiber first and second ends in a predetermined way to match the mode field diameter of the bent fiber optic member to the mode field diameter of the first and second fiber optic members, and interconnecting said first and second fiber optic members with the bent fiber first and second ends in a way which defines a continuous light path in cooperation with the first and second light paths using the bent member therebetween.

20. The improvement according to claim 19 further comprising the step of thermally relieving the stress in the bent fiber optic member.

* * * * *